United States Patent [19]
Cole et al.

[11] 3,878,820
[45] Apr. 22, 1975

[54] ROTARY COMBUSTION ENGINE GAS SEAL ARRANGEMENT

[75] Inventors: Edward N. Cole, Bloomfield Hills; Raymond P. Canale, Warren, both of Mich.

[73] Assignee: General Motors Corporation, Detroit, Mich.

[22] Filed: Mar. 15, 1974

[21] Appl. No.: 451,487

[52] U.S. Cl. .................................. 123/8.45; 418/99
[51] Int. Cl. ............................................ F02b 53/00
[58] Field of Search ....... 123/8.01, 8.05, 8.13, 8.45, 123/26; 418/91, 97, 99, 183

[56] References Cited
UNITED STATES PATENTS
3,546,878   12/1970   Yoshimura........................ 60/901 X Primary Examiner—C. J. Husar
Assistant Examiner—Michael Koczo, Jr.
Attorney, Agent, or Firm—Ronald L. Phillips

[57] ABSTRACT

A rotary combustion engine gas seal arrangement wherein a clean gas such as air, burned exhaust gas, or an inert gas is injected into each chamber near the leading end and behind the leading apex seal during the early part of compression to isolate the seal area at this location from unburned air-fuel mixture by means of the clean gas to reduce leakage of unburned air-fuel mixture at this location.

3 Claims, 5 Drawing Figures

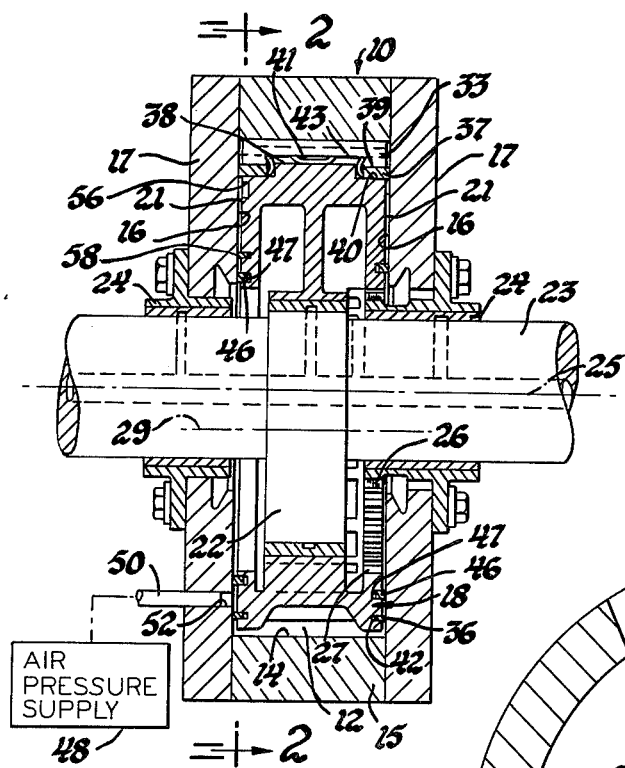
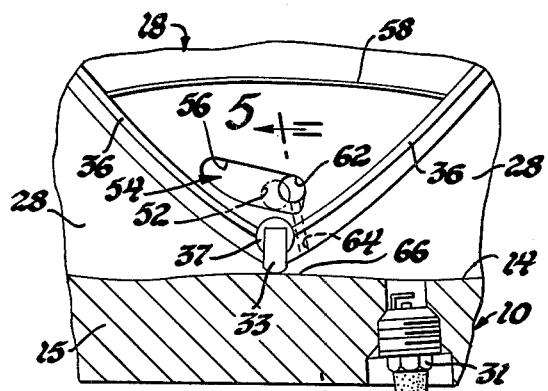
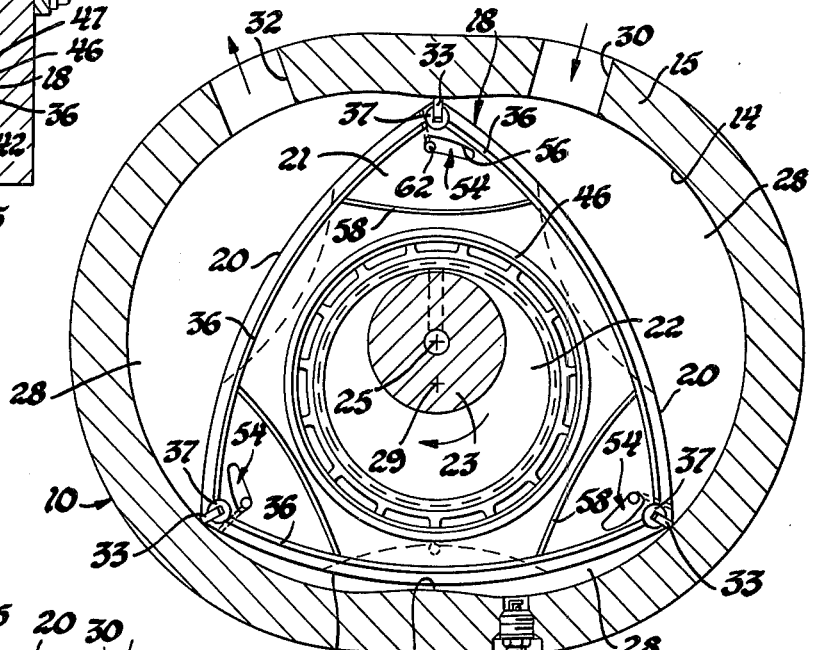
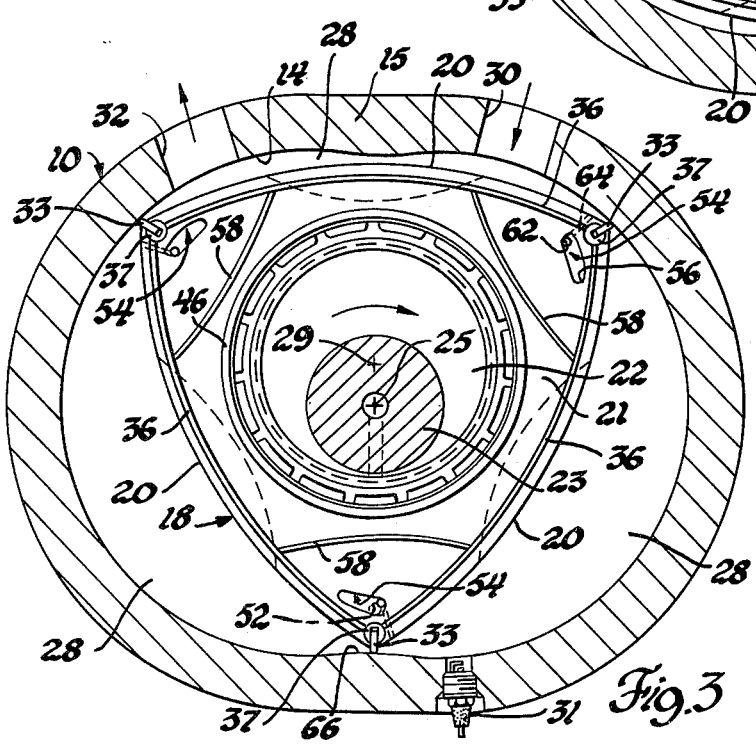
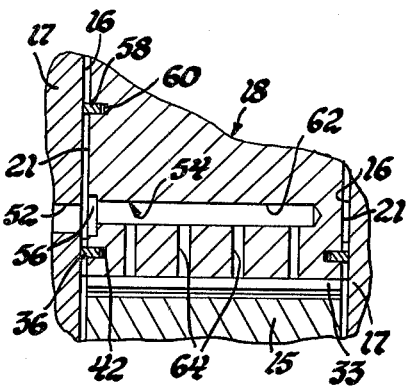

ROTARY COMBUSTION ENGINE GAS SEAL ARRANGEMENT

The present invention relates to a rotary combustion engine gas seal arrangement and more particularly to such an arrangement wherein only clean gas rather than unburned air-fuel mixture is permitted to leak past the engine's apex seals.

In the presently commercial rotary combustion engine, some leakage will occur across the apex seals even with the tightest type of apex seal design presently available. Instead of attempting to provide even tighhter sealing than that presently available, the gas seal arrangement according to the present invention injects a clean gas such as air, burned exhaust gas and the like through manifolds in the rotor into the respective working chambers near the trailing sides of their leading apex seals during the early part of compression. This isoltates the apex seal area from the unburned air-fuel mixture with the clean gas so that any leakage that does occur past the apex seal is limited to this clean gas rather than unburned air-fuel mixture.

An object of the present invention is to provide a new and improved rotary combustion engine gas sealing arrangement.

Another object is to provide in a rotary combustion engine a gas seal arrangement wherein any leakage past the engine's apex seals is limited to a clean gas rather than burned air-fuel mixture.

Another object is to provide in a rotary combustion engine a gas seal arrangement wherein injection manifolds in the rotor periodically supply a clean gas into each working chamber near the trailing side of the leading apex seal during the early part of compression to limit any leakage past the apex seal to the clean gas rather than unburned air-fuel mixture.

These and other objects of the present invention will become more apparent from the following description and accompnaying drawing in which:

FIG. 1 is a longitudinal sectional view of a rotary combustion engine having a gas seal arrangement according to the present invention.

FIG. 2 is a view taken along the line 2—2 in FIG. 1.

FIG. 3 is a view similar to FIG. 2 but showing the rotor in a position where the gas seal arrangement is injecting clean gas.

FIG. 4 is an enlarged view of part of FIG. 3.

FIG. 5 is a view taken along the line 5—5 in FIG. 4.

The gas seal arrangement according to the present invention is particularly suited for use in rotary combustion engines of the type shown in FIGS. 1 and 2. In this type engine there is a stationary multi-part outer body or housing 10 having a cavity 12 that is defined by an inwardly facing internal peripheral wall 14 of a rotor housing 15 and a pair of oppositely facing internal end walls 16 of end housings 17. The peripheral wall 14 is in the shape of a two-lobed epitrochoid or a curve parallel thereto and a rotor 18 having the general shape of a triangle with three peripheral faces 20 and parallel sides 21 is mounted within the rotor cavity 12 on an eccentric 22 of a crankshaft 23. Crankshaft 23 is mounted on opposite sides of the rotor in sleeve bearing assemblies 24 fixed in the end housings 17 so that it rotates about the center line 25 of peripheral wall 14. An annular external toothed gear 26 is integral with the inboard end of the right-hand sleeve bearing assembly 24 as viewed in FIG. 1, and is thus affixed to the housing 10. Gear 26 meshes with an internal toothed ring gear 27 which is concentric with and fixed to the rotor 18. The meshing gears 26 and 27 enforce a fixed, cyclic relation between the rotor and the crankshaft while the rotor faces 20 cooperate with the peripheral wall 14 and end walls 16 to define three variable volume working chambers 28. The chambers 28 are peripherally spaced around the rotor and move therewith within the housing as the rotor rotates about its axis 29 and planetates with respect to the crankshaft axis 25 to force the crankshaft to rotate. As shown in FIG. 2, an air-fuel inlet passage 30 whose opening and closing is effected by motion of the rotor 18 provides for periodic admission of air-fuel mixture to each chamber 28, a spark plug 31 provides for ignition of the mixture after compression and an exhaust passage 32 whose opening and closing is also effected by the motion of the rotor 18 provides for exhaust of the products of combustion from each chamber. Thus, as the rotor rotates in the direction indicated by the arrow each chamber undergoes intake, compression, expansion and exhaust to provide a power phase for each revolution of the crankshaft. The structure thus far described is conventional and operates efficiently assuming there is good sealing between the working chambers 28.

Sealing of the chambers 28 is normally effected by a sealing arrangement comprising an apex seal 33 at each rotor apex and side seals 36 on each rotor side which extend between the apex seals with an intermediate corner seal 37 near each rotor apex in each rotor side providing a sealing link between the ends of adjacent side and apex seals. Each of the apex seals 33 is mounted in an axially extending, radially outwardly facing slot 38 at each rotor apex that extends axially from one rotor side to the other with the apex seal being received at its outboard ends in an axially extending, radially outwardly facing slot 39 in the corner seals 37. The side seals 36 which are arcuate strips with a rectangular cross-section are mounted in accommodating arcuate grooves in the two sides of the rotor and extend between and sealingly engage the corner seals 37 which are mounted in accommodating apertures 40 in the sides of the rotor contiguous with the opposite ends of each apex seal slot 38. Each of the apex seals 33 is biased radially outward to sealingly contact the peripheral wall 14 by a spring 41 while both the side seals 36 and corner seals 37 are urged axially outward to engage the opposite end wall 16 by springs 42 and 43, respectively. In addition to this gas sealing arrangement, there is provided in each rotor side a circular oil seal 46. The oil seals 46 are mounted radially inward of the side seals 36 in accommodating circular grooves in the two sides of the rotor 18 concentric with the rotor. Each of the oil seals 46 is urged axially outward to sealingly engage the opposite rotor end wall 16 by a spring 47.

It has been found that with such a gas seal arrangement for the working chambers 28 wherein either a one-piece apex seal is employed as shown or tighter sealing is provided at the apexes such as by multi-piece apex seal designs and the like, there will still be some leakage past the apex seals in the direction of lowest pressure. In contrast to attempting to improve the design of the apex seal, the gas seal arrangement according to the present invention provides for limiting any leakage past the apex seals to a clean gas rather than unburned air-fuel mixture which has the effect of both reducing hydrocarbon emissions and improving fuel utilization. This is accomplished with a clean air pressure supply 48 which is connected by a hose 50 to an injection part 52 in one of the end walls 16 as shown in FIG. 1. As best shown in FIGS. 3, 4 and 5, the injection port 52 is radially located to periodically communicate with injection manifolds 54 which correspond in number to the rotor apexes and are formed in the rotor 18 with each manifold located near one of the rotor apexes. Each of the manifolds 54 has an inlet port 56 that is formed in the rotor side 21 opposite the end wall 16 with the injection port 52 and is elongated in the direction of rotor rotation to maintain connection of the injection port 52 with the manifold for a limited extent of rotor rotation after the start of compression in the chamber to which it is then delivering as will be described in more detail later.

The periodic connections of the injection port 52 with the manifolds 54 are sealed, as shown in FIGS. 2, 3 and 4, by the terminal portions of the two side seals 36 and corner seal 37 at each rotor apex and an additional arcuate seal 58. Each of the seals 58 is a strip of rectangular cross-section and is located in an accommodating arcuate groove radially inwardly of the associated manifold inlet port 56. Each seal 58 sealingly engages at its opposite ends with the adjacent two side seals to thus provide a closed loop while being urged axially outward to engage the opposite housing end wall 16 by a spring 60. It will also be appreciated that the additional seals 58 could surround the manifold inlet ports rather than utilizing assist from the existing seals.

Each of the injection manifolds 54 further has an elongated passage 62 which as best shown in FIG. 5 extends axially from the inlet port 56 and is connected therealong to a plurality of orifices 64. The orifices 64 are spaced along the width of the rotor and extend radially outwardly through the rotor face 20 at the leading end of the associated working chamber immediately behind or on the trailing side of the apex seal 33 at this corner of the rotor as best shown in FIGS. 4 and 5. The injection port 52 is angularly located on the housing end wall 16 so that it connects with the injection manifolds 54 immediately after the trailing apex seals 33 of the respective working chambers 28 have passed the air-fuel inlet passages 30 as shown in FIG. 3. Furthermore, the angular extent of the manifold inlet ports 56 is determined so that the air-injection connection is terminated above certain compression pressures; for example, more than one atmosphere at full engine load. Thus, the pressure of air-injection is maintained relatively small. As best shown in FIG. 2, the angular location of the injection port 52 to start the injection in this engine arrangement is in-line with the peripheral wall's cusp 66 that is in the combustion zone while the angular extent of the manifold inlet ports is made several times that of the injection port to cut-off the air injection before substantial compression pressures are reached.

The air that is thus injected near the leading ends of the respective chambers during the compression phase is then trapped against the trailing edge of the leading apex seal by the natural movement of gases in the working chamber as the rotor continues to turn. Then on continued compression followed by combustion pressure increase, whatever leakage occurs across this leading apex seal is in the direction of rotor rotation and is thus confined or limited to the injected air with whatever injected air that remains being exhausted normally. In other words, the apex seal area is isolated from the unburned air-fuel mixture by the clean injected air and any leakage which does occur consists of clean air rather than unburned fuel. This has the effect of both reducing hydrocarbon emissions and improving fuel utilization.

It will also be appreciated that instead of employing clean air as the clean gas, other clean gases such as burned exhaust gas could be employed to provide the isolation zone behind the leading apex seal as the compression and combustion pressures increase to force leakage. Furthermore, the clean gas pressure can be controlled to provide varying amounts of air for such isolation according to varying engine operating conditions. For example, the pressure of the clean gas supply can be increased to provide greater clean gas isolation to compensate for increasing leakage with increasing engine load.

The above described embodiment is illustrative of the invention which may be modified within the scope of the appended claims.

We claim:

1. A rotary combustion engine comprising housing means having an interior multi-lobed peripheral wall and oppositely facing interior side walls defining a cavity, a crankshaft rotatably mounted in said housing means having an eccentric located in said cavity, a multi-apex rotor rotatably mounted on said eccentric having sides opposite said side walls and a plurality of peripheral faces opposite said peripheral wall, said rotor faces and said housing walls cooperating to provide a plurality of working chambers that are spaced about and move with said rotor within said rotor housing while varying in volume as said rotor planetates, gas seal means mounted on said rotor for sealingly contacting said housing walls to seal said working chambers from each other, said gas seal means including apex seal means mounted on each said rotor apex having a sealing surface sealingly contacting said peripheral wall and also having leading and trailing sides relative to the direction of rotor rotation, said housing means having air-fuel inlet passage means periodically opened to said working chambers by said rotor past said gas seal means as said rotor planetates, said housing means further having exhaust passage means periodically opened to said working chambers by said rotor past said gas seal means as said rotor planetates, a spark plug mounted on said housing means periodically exposed to said working chambers as said rotor planetates whereby with said engine structure air-fuel mixture is taken into said working chambers, compressed, ignited and then exhasted to effect powering of said crankshaft, a clean gas pressure supply a clean gas injection port in one of said side walls operatively connected to said clean gas pressure supply, a plurality of injection manifolds in said rotor corresponding to the number of rotor apexes, each said injection manifold having an orifice that extends through one of said rotor faces near the leading end of the associated working chamber and the trailing side of the leading apex seal means of this working chamber, each said injection manifold further having an inlet port in the rotor side opposite said one side wall that is periodically opened to said injection port as said rotor planetates, and said injection port and said inlet ports arranged so that their periodic connections start and end early during compression in the working chambers whereby clean gas is injected near the leading end of each working chamber at low compression pressures and is then trapped on the trailing side of the leading apex seal means of this working chamber by the natural movement of gases as the rotor continues to turn so that on continued compression and then combustion pressure increase whatever leakage occurs across the leading apex seal is confined to the injected clean gas rather then unburned air-fuel mixture.

2. A rotary combusition engine comprises housing means having an interior multi-lobed peripheral wall and oppositely facing interior side walls defining a cavity, a crankshaft rotatably mounted in said housing means having an eccentric located in said cavity, a multi-apex rotor rotatably mounted on said eccentric having sides opposite said side walls and a plurality of peripheral faces opposite said peripheral wall, said rotor faces and said housing walls cooperating to provide a plurality of working chambers that are spaced about and move with said rotor within said rotor housing while varying in volume as said rotor planetates, gas seal means mounted on said rotor for sealingly contacting said housing walls to seal said working chambers from each other, said gas seal means including apex seal means mounted on each said rotor apex having a sealing surface sealingly contacting said peripheral wall and also having leading and trailing sides relative to the direction of rotor rotation, said housing means having air-fuel inlet passage means periodically opened to said working chambers by said rotor past said gas seal means as said rotor planetates, said housing means further having exhausted passage means periodically opened to said working chambers by said rotor past said gas seal means as said rotor planetates, a spark plug mounted on said housing means periodically exposed to said working chamers as said rotor planetates whereby with said engine structure air-fuel mixture is taken into said working chambers, compressed, ignited and then exhausted to effect powering of said crankshaft, a clean gas pressure supply, a clean gas injection port in one of said walls operatively connected to said clean gas pressure supply, a plurality of injection manifolds in said rotor corresponding to the number of rotor apexes, each said injection manifold having a plurality of orifices that extend through one of said rotor faces along and near the leading end of the associated working chamber and the trailing side of the leading apex seal of this working chamber, each said injection manifold further having an inlet port in the rotor side opposite said one side wall that is periodically opened to said injection port as said rotor planetates, and said injection port and said inlet ports arranged relative to each other and inward of said gas seal means so that their periodic connections only occur in the early stage of compression in the working chambers whereby clean gas is injected near the lading end of each working chamber at low compression pressures and is trapped on the trailing side of the leading apex seal means of this working chamber by the natural movement of gases as the rotor continues to turn so that on continued compression and then combustion pressure increase whatever leakage occurs across the leading apex seal is confined to the injected clean gas rather than unbruned air-fuel mixture.

3. A rotary combustion engine comprising housing means having an interior multi-lobed peripheral wall and oppositely facing interior side walls defining a cavity, a crankshaft rotatably mounted in said housing means having an eccentric located in said cavity, a multi-apex rotor rotatably mounted on said eccentric having sides opposite said side walls and a plurality of peripheral faces opposite said peripheral wall, said rotor faces and said housing walls cooperating to provide a plurality of working chambers that are spaced about and move with said rotor within said rotor housing while varying in volume as said rotor planetates, gas seal means mounted on said rotor for sealingly contacting said housing walls to seal said working chambers from each other, said gas seal means including apex seal means mounted on each said rotor apex having a sealing surface sealingly contacting said peripheral wall and also having leading and trailing sides relative to the direction of rotor rotation, said gas seal means further including side seal means mounted on each rotor side sealingly contacting the opposite side wall and extending adjacent each of said rotor faces between said rotor apexes, said gas seal means further including corner seal means mounted on each rotor side adjacent said rotor apexes and contacting the opposite side wall and sealingly joined said apex seal means and said side seal means, said housing means having air-fuel inlet passage means periodically opened to said working chambers by said rotor past said gas seal means as said rotor planetates, said housing means further having exhaust passage means periodically opened to said working chambers by said rotor past said gas seal means as said rotor planetates, a spark plug mounted on said housing means periodically exposed to said working chambers as said rotor planetates whereby with said engine structure air-fuel mixture is taken into said working chambers, compressed, ignited and then exhausted to effect powering of said crankshaft, a clean gas pressure supply, a clean gas injection port in one of said side walls operatively connected to said clean gas pressure supply, a plurality of injection manifolds in said rotor corresponding to the number of rotor apexes, each said injection manifold having a plurality of axially spaced orifices that extend through one of said rotor faces near the leading end of the associated working chamber and the trailing side of the leading apex seal means of this working chamber, each said injection manifold further having an inlet port in the rotor side opposite said one side wall that is periodically opened to said injection port as said rotor planetates, injection seal means in the rotor side opposite said one side wall for cooperating with said side seal means and said corner seal means to seal the connections of said inlet ports with said injection port, and said injection port and said inlet ports located and sized in relation to each other so that their periodic connections start after the beginning of compression in the working chambers and terminate during compression prior to chamber pressure exceeding about one atmosphere whereby clean gas is injected near the leading end of each working chamber during compression and is then trapped on the trailing side of the leading apex seal means of this working chamber by the natural movement of gases as the rotor continues to turn so that on continued compression and then combustion presure increase whatever leakage occurs across the leading apex seal is confined to the injected clean gas rather than unburned air-fuel mixture.

* * * * *

UNITED STATES PATENT OFFICE
CERTIFICATE OF CORRECTION

PATENT NO. : 3,878,820
DATED : April 22, 1975
INVENTOR(S) : Edward N. Cole, Raymond P. Canale It is certified that error appears in the above-identified patent and that said Letters Patent are hereby corrected as shown below:

Column 3, line 2, "part" should read -- port --.
Column 4, line 53, after "supply" insert -- , --.
Column 5, line 32, "exhausted" should read -- exhaust --; line 41, after "said" (first occurrence) insert -- side --; line 56, "lading" should read -- leading --; line 57, after "is" insert -- then --; line 64, "bruned" should read -- burned --.

Signed and Sealed this twenty-first Day of October 1975

[SEAL]

Attest:

RUTH C. MASON
Attesting Officer

C. MARSHALL DANN
Commissioner of Patents and Trademarks